United States Patent [19]

Gonzalez et al.

[11] Patent Number: 5,508,015

[45] Date of Patent: Apr. 16, 1996

[54] PROCESS FOR CONTROLLING AGGLOMERATION IN THE MANUFACTURE OF $TIO_2$

[75] Inventors: Raul A. Gonzalez, Newark, Del.; Charles D. Musick, Waverly; James N. Tilton, Newark, Del.

[73] Assignee: E. I. Du Pont de Nemours and Company, Wilmington, Del.

[21] Appl. No.: 276,184

[22] Filed: Jul. 15, 1994

[51] Int. Cl.⁶ ................................................. C01G 23/047
[52] U.S. Cl. ........................... 423/613; 423/614; 106/437
[58] Field of Search .................................. 423/614, 613; 106/437

[56] References Cited

U.S. PATENT DOCUMENTS

| | | | |
|---|---|---|---|
| 2,488,439 | 11/1949 | Schaumann | 423/613 |
| 2,488,440 | 11/1949 | Schaumann | 423/613 |
| 2,559,638 | 7/1951 | Krchma et al. | 106/437 |
| 2,721,626 | 10/1955 | Rick | 423/613 |
| 3,073,712 | 1/1963 | Wigginton et al. | 423/614 |
| 3,640,745 | 2/1972 | Darr et al. | 423/613 |
| 3,650,694 | 3/1972 | Allen | 423/613 |
| 4,241,042 | 12/1980 | Matijevic et al. | 423/613 |
| 4,574,078 | 3/1986 | Cortesi et al. | 423/608 |

Primary Examiner—Steven Bos

[57] ABSTRACT

A chloride process for producing $TiO_2$ by addition of an inert gas in a vapor phase reaction of $TiCl_4$ and an oxygen-containing gas is disclosed.

5 Claims, No Drawings

PROCESS FOR CONTROLLING AGGLOMERATION IN THE MANUFACTURE OF $TiO_2$

BACKGROUND OF THE INVENTION

This invention relates to a chloride process for producing $TiO_2$ by addition of an inert gas in a vapor phase oxidation of $TiCl_4$ and more particularly, to a process for controlling $TiO_2$ agglomeration by addition of the inert gas into a reaction zone where the $TiO_2$ particles are formed.

U.S. Pat. No. 4,574,078 and related U.S. Pat. Nos. 4,241,042 disclose addition of an inert gas as a carrier gas and diluent in a process to hydrolyze volatile titanium compounds. Therein, the inert gas is added before reaction of the volatile titanium compound with steam. No mention is made of using an inert gas to control particle size and/or agglomeration of the $TiO_2$.

A chloride process for producing $TiO_2$ pigment by reacting $O_2$-containing gas and $TiCl_4$ at temperatures ranging from 900° to 1600° C. in a vapor phase is known. The resulting hot gaseous suspension of $TiO_2$ particles and free chlorine is discharged from the reactor and must be quickly cooled below 600° C. within about 5 to 100 seconds. This cooling is accomplished in a conduit, i.e., a flue so that undesired $TiO_2$ particle size growth is prevented and particle agglomeration is minimized. Pigment product properties such as carbon black undertone (CBU) and gloss are a function of primary particle size and particle agglomeration, respectively. If high agglomeration of $TiO_2$ results, the $TiO_2$ must be milled or ground in an energy intensive, expensive process such as micronizing to reduce the size of agglomerates in order to achieve the desired pigment properties.

The chloride process described above, however, produces $TiO_2$ with variable agglomeration as production rate changes. The need therefore exists for a solution to maintain the degree of agglomeration as constant as possible. The degree of agglomeration changes also according to size and design of cooling flues. There is need to maintain a given level of agglomeration if larger diameter flues are used as these might lead to reduced agglomeration on account of reduced turbulence. The present invention meets those needs.

SUMMARY OF THE INVENTION

In accordance with this invention, there is provided a chloride process for producing $TiO_2$ comprising reacting at least vaporous $TiCl_4$ and an oxygen-containing gas in the presence of an inert gas.

It has been found that the process of this invention maintains the degree of agglomeration of a $TiO_2$ pigment as constant as possible thus resulting in a more uniform quality product. The quality of the $TiO_2$ pigment product is linked to the degree of agglomeration. Further, economic benefits in the $TiO_2$ manufacturing process are obtained. This invention also provides greater flexibility for producing high and low gloss grades of pigmentary $TiO_2$ if the size of the reactor and/or cooling flues is increased, and for producing both high and low gloss grades on the same size reactor and cooling flues.

DETAILED DESCRIPTION

The production of $TiO_2$ by the vapor phase oxidation of $TiCl_4$ is well known and disclosed in U.S. Pat. Nos. 2,488,439 and 2,559,638, the teachings of which are incorporated herein by reference. The present invention relates specifically to an improvement in the aforementioned processes.

$TiCl_4$ is evaporated and preheated to temperatures of from about 300° to about 650° C. and introduced into a reaction zone of a reaction vessel which is raised to a peak temperature of about 1000° to 1600° C. at about 10–80 psig.

The oxygen-containing gas is preheated to at least 1200° C. and is continuously introduced into the reaction zone through a separate inlet from an inlet for the $TiCl_4$ feed stream. Optionally, the oxygen-containing gas can also contain a vaporized alkali metal salt such as CsCl or KCl, etc. which is one of the tools used to control particle growth.

As a result of mixing of the reactant streams, substantially complete oxidation of $TiCl_4$ takes place but for conversion limitations imposed by temperature and thermochemical equilibrium. Solid particles of $TiO_2$ form. The reaction product containing a suspension of $TiO_2$ particles in a mixture of chlorine and residual gases is carried from the reaction zone at temperatures considerably in excess of 1000° C. and is subjected to fast cooling in the flue. The cooling can be accomplished by any conventional means as known in the art or described below. $TiO_2$ particles leaving the cooling flues are often referred to as an "oxidation base".

In carrying out the invention, the inert gas is added downstream from the $TiCl_4$ stream addition. The exact point of inert gas addition or injection will depend on the reactor design, flow rate, temperatures, pressures, production rates and rate of cooling of the reaction mass, but can be determined readily by testing to obtain the desired effects on agglomeration and particle size. For example, the inert gas may be added at one or more points downstream from where the $TiCl_4$ and oxygen-containing gas are initially contacted. Often, the point or points of addition will be located at a downstream distance traveled by the reactants or reaction products of about 2 to about 200 feet, preferably about 5 to about 50 feet, after the initial contact of the reactants.

Suitable chemically inert gases include nitrogen, chlorine, carbon dioxide, mixtures thereof, or gas mixtures rich in nitrogen, chlorine, and/or carbon dioxide, and mixtures thereof, preferably nitrogen of >90% purity. Mixtures rich in a particular inert gas is defined as >75% of the inert gas or gases present in the mixture. In a preferred embodiment, nitrogen is added continuously downstream in the conduit or flue where scouring particles or scrubs are added to minimize the buildup of $TiO_2$ in the interior of the flue during cooling as described in greater detail in U.S. Pat. No. 2,721,626, the teachings of which are incorporated herein by reference. In this embodiment the nitrogen can be added at one or more points either individually or simultaneously through one or more nozzles or orifices. A relatively small amount of the chemically inert gas such as cold, high pressure nitrogen is injected often in amounts from about 0.005 pounds to about 0.5 pounds per pound of $TiO_2$, preferably about 0.01 pounds to about 0.1 pounds per pound of $TiO_2$, and the temperature of nitrogen is about −200° to about 1000° C., preferably about −20° to about 200° C.

The injection of the chemically inert gas at high pressure controls agglomeration through turbulent dissipation of kinetic energy. Flowing from a high pressure source, the injected gas accelerates to high velocity as it passes through a nozzle or orifice into the reaction mixture. The high velocity gas has a large kinetic energy per unit mass, equal to one-half of the square of its velocity. The total rate of addition of kinetic energy by the injected gas is equal to the kinetic energy per unit mass multiplied by the mass flow rate of injected gas. This kinetic energy is dissipated by turbulence generated as the injected jet decelerates while mixing with the reaction mixture. The generated turbulence increases the collision rate between particles in the reaction mixture, and thus increases the degree of agglomeration. By controlling the rate of addition of kinetic energy, the degree of agglomeration can be controlled.

The rate of addition of kinetic energy is affected by both the mass rate of gas injection and the kinetic energy per unit mass of injected gas, the latter being equal to one-half the square of gas velocity. The size and shape of the injection nozzle or orifice, and gas pressure upstream of the orifice, control the mass rate of injection and the kinetic energy per unit mass. For a given injection nozzle or orifice, both the mass flow rate and the jet velocity increase with increasing ratio of injection gas pressure upstream of the nozzle or orifice to the reactor pressure. When the pressure ratio is greater than or equal to that required to obtain sonic velocity in the orifice or nozzle throat (section of minimum cross-sectional area), the mass flow rate becomes directly proportional to the upstream pressure. In this condition, the maximum exit velocity, and hence kinetic energy, may be obtained using a supersonic nozzle shape with exit area to throat area ratio calculated to give the maximum exit supersonic velocity corresponding to the pressure ratio. For a given pressure ratio, the mass flow rate is directly proportional to the minimum cross-sectional area of the injection nozzle or orifice. Use of a supersonic nozzle shape, however, is not critical to the invention. Any nozzle shape, with the appropriate minimum cross-sectional area, may be used to carry out the inert gas injection.

For a given desired rate of kinetic energy addition, use of larger nozzles or orifices enables use of lower injection gas supply pressure, but requires more gas, whereas use of smaller nozzles or orifices allows use of less injection gas but requires greater supply pressure. In carrying out the invention, often the injection nozzles or orifices may be sized to provide the desired gas injection rates as described above with supply pressures ranging from about 50 to about 10,000 psig above reactor pressure, preferably about 500 to about 5000 psig. The rate and pressure of the introduction of the inert gas will vary depending upon the desired degree of agglomeration of the $TiO_2$ particles.

The $TiO_2$ pigment is recovered from the cooled reaction products by conventional separation treatments, including cyclonic or electrostatic separating media, filtration through porous media or the like. The recovered $TiO_2$ may be subjected to surface treatment, milling, grinding or disintegration treatment to obtain the desired level of agglomeration.

$TiO_2$ pigment products are tested for Carbon Black Undertone (CBU), a measure of particle size uniformity that depends to a certain extent on the amount of particles present as agglomerates. The higher the CBU, the smaller the particles. A typical CBU for $TiO_2$ used in paint is about 10. CBU is determined by mulling together a suitable liquid, such as light colored oil and standard weights of the sample and a standard carbon black. The mixture is spread on a panel and the relative blueness of the gray mixtures observed. Fine particles give bluer undertone or higher CBU. CBU is described in greater detail in U.S. Pat. No. 2,488,440, the teachings of which incorporated herein by reference except using a reference value of 10 rather than 100 as used therein.

Particle size distribution of the pigment products is measured by sedimentation analysis, with a SEDIGRAPH®, i.e., x-ray sedimentometer (Micromeritics Instrument Corp., Norcross, Ga.) after dispersion in aqueous suspension by fixed level sonication. The percent greater than 0.6 microns fraction is a measure of agglomeration and of the potential for peak gloss in the finished product, a value that cannot be exceeded while applying any reasonable grinding energy level. The inert gas injection can be carried out in a way that affects agglomeration.

To give a clearer understanding of the invention, the following Examples are construed as illustrative and not limitative of the underlying principles of the invention.

EXAMPLES

EXAMPLE 1

$TiCl_4$ vapor was heated to 415° C. and continuously admitted to a reaction chamber. Simultaneously, oxygen, preheated to 1545° C. was continuously admitted to the same reaction chamber through a separate inlet. The production rate was 18 tons $TiO_2$ per hour. The reactant streams were rapidly mixed. At a location approximately 45 feet from the point where the gaseous $TiCl_4$ and oxygen were initially contacted, about 1100 lb/hr of nitrogen at a pressure of 1100 psig at −15° C. were injected into the reaction mass through a nozzle for a test period of 90 minutes. The gaseous suspension of $TiO_2$ was then quickly cooled in the flues.

The titanium dioxide pigment was separated from the cooled gaseous products by conventional means. The recovered titanium dioxide pigment was then treated by conventional pigment treatment procedures and ground to desired texture.

EXAMPLE 2

A test similar to that described in Example 1 was performed. The titanium tetrachloride was preheated to 410° C. The oxygen was preheated to 1540° C. The production rate was 14 tons $TiO_2$ per hour.

(A) At a location approximately 10 feet from the point where the gaseous $TiCl_4$ and oxygen were initially contacted, 1600 lb/hr of nitrogen at 1600 psig and at −15° C. were injected into the reaction mass.

(B) A second injection of nitrogen, at −15° C., was also performed subsequent to the first injection at the same location but with 600 lb/hr of nitrogen at 600 psig.

EXAMPLE 3

A third series of tests similar to Example 1 was performed. The production rate was 14 tons $TiO_2$ per hour. The reactant streams were rapidly mixed. At a location approximately 45 feet from the point where the gaseous $TiCl_4$ and oxygen were initially contacted, high pressure nitrogen gas was added to the flue through one or two nozzles. The valve arrangement allowed the use of both nozzles simultaneously or individually. Nozzle #1 was designed to add 1000 pph of $N_2$ at 1000 psig. It was located 45'7" from the point where the reactants were initially contacted. Nozzle #2 was designed to add 3000 pph of $N_2$ at 1000 psig. It was located 45'10" from the point where the reactants were initially contacted. As pressure changes, the $N_2$ feed rate changes proportionally.

(A) 3800 lb/hr of nitrogen at 950 psig and −25° C. was added to the reaction mass. This was accomplished by adding the nitrogen through both nozzles simultaneously;

(B) 3150 lb/hr of nitrogen at 1050 psig and −25° C. was added to the reaction mass. This was accomplished using nozzle #2 only; and (C) 1350 lb/hr of nitrogen at 1350 psig and −25° C. was added to the reaction mass. This was accomplished by using nozzle #1 only.

Evaluations

The quality of the products of the examples were evaluated using conventional tests for titanium dioxide pigments as discussed above and summarized in Table 1. The evaluations were performed using the oxidation base products from the Examples. Results for "control" refers to titanium dioxide product that was produced without the addition of the inert gas. The results for the examples of the present invention are listed as "test".

In prior plant experience, it has been determined that CBU changes can, to a certain extent, affect the % >0.6 microns value. For example, if CBU decreases about 1 unit, there is an increase in % >0.6 microns of about 2%. The parenthetical numbers shown for % >0.6 microns in Examples 2A and 2B represent estimates for a CBU test condition equal that of the control. Due to the limited duration of the plant test for Examples 2A and 2B, there was not sufficient time during the test to maintain a CBU equal to the control.

TABLE 1

| | EXAMPLE | | | | | | | | |
|---|---|---|---|---|---|---|---|---|---|
| | 1 | 2A | | 2B | | 3A | 3B | 3C |
| Production rate, tons/hour | 18 | 14 | | 14 | | 14 | 14 | 14 |
| % >0.6 microns, control | 23.5 | 20.6 | | 20.7 | | 21.6 | 21.9 | 22.2 |
| % >0.6 microns, test | 25.8 | 23.2 | (25.4) | 20.7 | (23.1) | 24.5 | 23.8 | 23.7 |
| CBU, control | 10.7 | 11.3 | | 10.7 | | 10.5 | 10.6 | 10.6 |
| CBU, test | 10.8 | 12.4 | (11.3) | 11.9 | (10.7) | 10.7 | 10.8 | 10.7 |

Gloss change: control and test material from Example 1 were used to prepare a corresponding finished pigment grade by coating both separately with a thin alumina layer by appropriate surface treatment followed by filtration, drying and micronization. The fractions >0.6 micron for control and test were 7.9 and 8.4% respectively, and the corresponding emulsion gloss levels were 67 and 64 respectively. These results show that the test material was permanently made more agglomerated by the procedure of this invention.

Having thus described and exemplified the invention with a certain degree of particularity, it should be appreciated that the following claims are not to be limited but are to be afforded a scope commensurate with the wording of each element of the claims and equivalents thereof.

We claim:

1. A chloride process for producing $TiO_2$ comprising reacting at least vaporous $TiCl_4$ with an oxygen-containing gas to form a reaction mass in the presence of an inert gas injected into the reaction mass in an amount of about 0.005 to about 0.5 pounds per pound of $TiO_2$ and at a temperature of about −200° C. to about 1000° C. and at a pressure of about 500 to about 10,000 psig above reactor pressure.

2. The process of claim 1 wherein the inert gas is introduced at one or more points downstream of where the oxygen containing gas and $TiCl_4$ are initially reacted.

3. The process of claim 2 wherein the inert gas is introduced at about 2 to about 200 feet after initial contact of the oxygen-containing gas and $TiCl_4$.

4. The process of claim 3 wherein the inert gas is selected from the group consisting of nitrogen, chlorine, carbon dioxide, mixtures thereof, and gas mixtures rich in nitrogen, chlorine, carbon dioxide, and mixtures thereof.

5. The process of claim 4 wherein the inert gas is nitrogen and is added in an amount of about 0.01 to about 0.1 pounds per pound of $TiO_2$ at about −20° C. to about 200° C. at about 500 to 5000 psig above the reactor pressure.

* * * * *